Dec. 3, 1957 J. F. STEPHENS 2,814,832
PROCESS FOR PRODUCING SUPERFINE GLASS FIBERS
Filed May 4, 1953
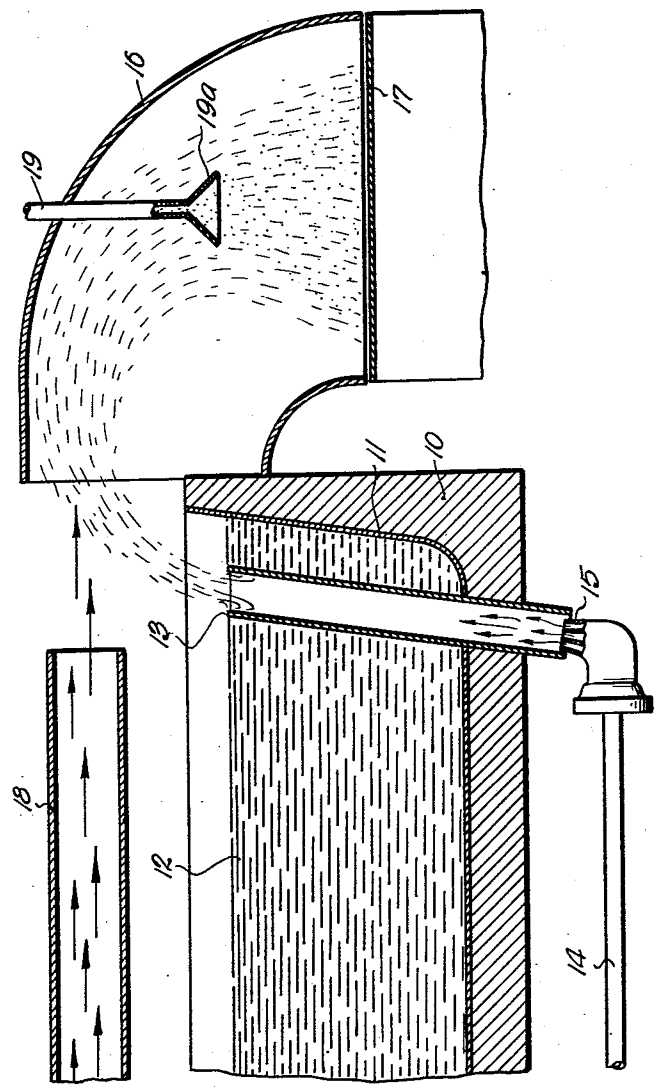
INVENTOR.
Joseph F. Stephens
BY Thos E. Sopied
ATTORNEY.

United States Patent Office 2,814,832 Patented Dec. 3, 1957

2,814,832

PROCESS FOR PRODUCING SUPERFINE GLASS FIBERS

Joseph F. Stephens, Kansas City, Mo., assignor to Gustin-Bacon Manufacturing Company, a corporation of Missouri Application May 4, 1953, Serial No. 352,612
2 Claims. (Cl. 18—47.3)

This invention relates to improvements in the production of superfine glass fibers and refers more particularly to a process in which the glass fibers are blasted from a film of molten glass overflowing into a tube from a reservoir or tank, the hot gas blast being directed through the tube or standpipe located in the molten glass body and into which the glass overflows.

Superfine fibers of glass within the range of ¾ to 5 microns have been produced by heat blasting the surface of a plurality of coarse continuous glass filaments mechanically fed into the path of the heated blast. The temperature of the blast, its velocity and the time of exposure of the continuous rods or filaments to the effect of the blast are such as to progressively melt thin outer layers of the filaments which the blast shreds or strips off in the form of superfine diameter glass fibers. It is therefore requisite that the superfine fibers be stripped from the periphery or outer layers of the coarse filaments continuously and before the flowable or molten layers have a chance to appreciably thicken.

In such a method the coarse filaments are completely consumed and there is the appearance of a continuous filament gradually disintegrating as it is mechanically fed in to the blast since the superfine fibers are individually not discernible to the eye; in other words, the coars filament ends disappear much in the manner of shaving off the end of a pencil.

By the instant process the necessity of forming coarse glass filaments is avoided; the fibers being blasted from a hot molten stream overflowing into the blast tube are more uniformly sized and contain less fibers of varying diameters. The single figure depicts diagrammatically an apparatus in which the process may be carried out. The drawing forms a part of the specification and is to be read in conjunction therewith. Referring to the drawings at 10 is shown heavy insulation of any suitable type supporting a vessel or tank 11 preferably formed from platinum or platinum alloy capable of withstanding the temperatures necessary to sustain the molten glass body shown at 12. The mechanism by which the constituents of the glass batch are supplied to the glass body and the manner of heating the batch have been omitted in the interest of simplicity, since conventional apparatus for performing these functions are employed.

Extending upwardly through the tank and body of the glass is a standpipe or fiber-forming tube 13. In the drawing but a single tube is shown, but it is contemplated that a plurality of these tubes may be employed. At the lower end of the tube 13 is a burner or combustion nozzle comprising an inner fuel pipe 14 surrounded by a housing or jacket 15 through which air is supplied. The upper end of the tube or tubes terminates just below the level of the molten glass body, or it is probably more accurate to say that the glass level is maintained slightly above the upper ends of the tubes.

In operation the molten glass is brought to proper flowable temperature and the level of the melt is raised until it overflows the standpipe or blast tube 13 in a thin film-like stream. Hot combustion gas produced by burning fuel, preferably fuel gas, at the burner in the lower end of the standpipe or tube 13 passes upwardly through the tube at relatively high velocity disintegrating the melt which overflows the top of the tube and shredding the annular film into fine glass fibers.

A hood 16 is located adjacent the glass tank or glass-containing vessel with an inlet opening positioned to receive the glass fibers discharged from the top of the tube. An air blast jetted horizontally into the path of the fibers through tube 18 directs the fibers from the top of tube 13 into the hood 16 through the open inlet in the side of the hood. Located in the bottom of the hood is an endless traveling belt 17 upon which the fibers accumulate in the form of a mat. A binder material is supplied to the fibers in the hood through a nozzle pipe 19 and nozzle 19*a*, the binder being supplied and intimately intermingled with the fibers as they pass through the hood and are deposited upon the traveling support or foraminous belt 17. In this operation a dry binder may be used in place of a liquid binder to bond the fibers together in the form of a mat. After formation of the mat on the traveling support or belt, it passes to an oven not shown where the mat is shaped and cured by conventional methods. Vacuum may be imposed beneath the foraminous support 17 by drawing suction beneath the belt to compact more firmly the fibrous layer as it is deposited.

Thus it will be seen that there has been provided a process for the production of fine fiber in which the fiber is shredded, stripped or slivered by the aspirating effect of the gas blast upon an annular film overflowing the top of or fiber making blast tubes. This process eliminates the drawing of the glass from a melt through orifices and mechanically feeding the drawn coarse filaments into a gas blast. By passing the gas blast through the body of the melt temperatures of the glass and gas blast are more easily regulated and conditions of fiber making more accurately controlled. The temperature of the melt and the temperature and velocity of the blast obviously will be important factors in determining the size of the glass fibers produced.

From the foregoing it will be seen that the invention is well adapted to attain the ends and objects herein set forth, together with the other advantages which are obvious and inherent to the process. As many possible embodiments may be made of the invention without departing from the scope thereof, it is to be understood that all matter herein set forth or shown in the drawings is to be interpreted as illustrative and not in a limiting sense.

Having thus described my invention, I claim:

1. A process for the production of fine glass fibers comprising the steps of establishing a melt of glass having at least a portion of the surface thereof open in a reservoir, establishing a flow of hot combustion gas at a relatively high velocity through a stand pipe extending upwardly through the reservoir and issuing from the open portion of the surface of the melt, and establishing a thin, film-like flow of the glass into the end of the stand pipe at the surface of the melt whereby the gas blast will shred glass fibers upwardly from the surface of the melt from the glass film flow into the stand pipe.

2. A process as in claim 1 wherein a plurality of flows of hot combustion gas are established through stand pipes extending upwardly through the reservoir and issuing from the open portion of the surface of the melt and a thin, film-like flow of the glass is established into the end of each of the stand pipes at the surface of the melt.

References Cited in the file of this patent

UNITED STATES PATENTS

| | | |
|---|---|---|
| 2,156,316 | Slayter et al. | May 2, 1939 |
| 2,206,058 | Slayter et al. | July 2, 1940 |
| 2,333,218 | Von Pazsiczky | Nov. 2, 1943 |
| 2,338,473 | Von Pazsiczky | Jan. 4, 1944 |
| 2,511,381 | Stevens | June 13, 1950 |
| 2,569,472 | Hommel | Oct. 2, 1951 |